(No Model.) 3 Sheets—Sheet 1.
H. AXMANN.
DEVICE FOR REGULATING GAS AND AIR MIXTURES IN BUNSEN BURNERS.
No. 582,573. Patented May 11, 1897.
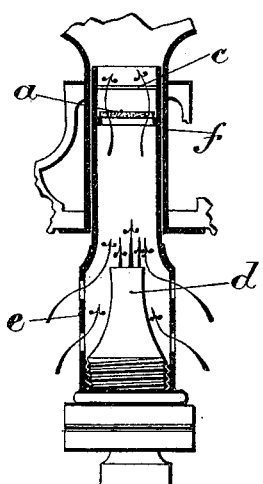
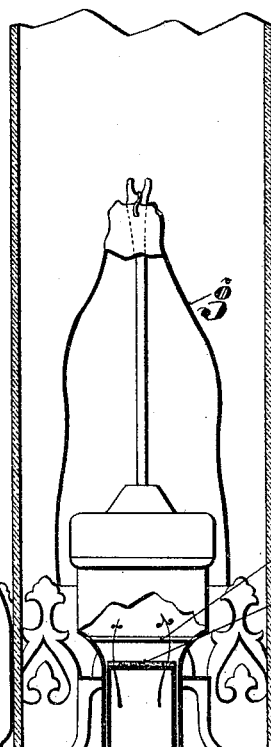
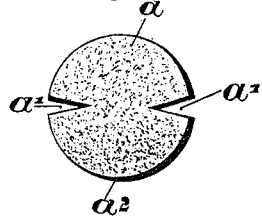
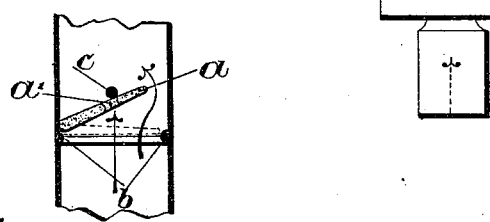
Inventor.
Hans Axmann,
By James L. Norris,
Atty.

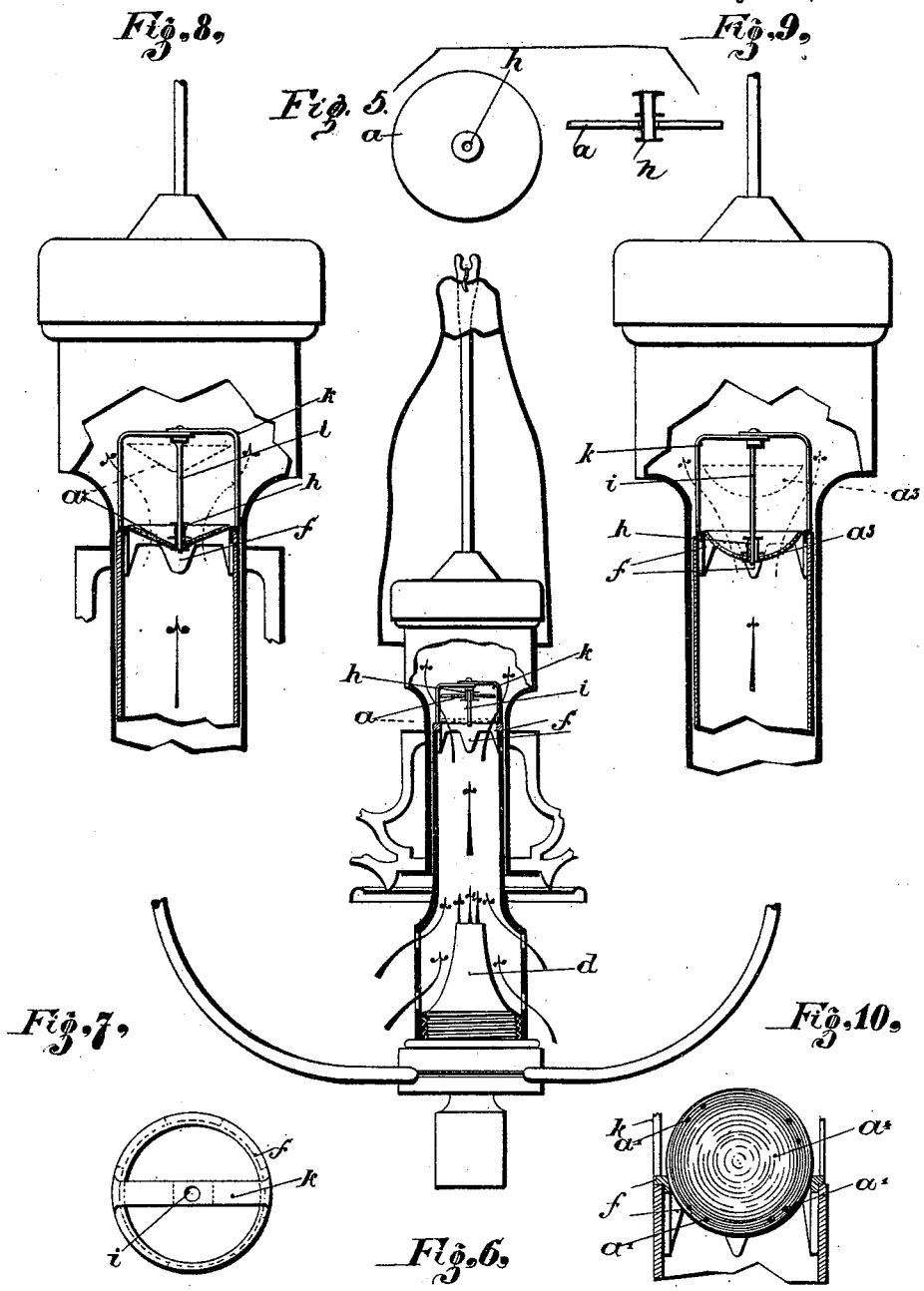

(No Model.) 3 Sheets—Sheet 3.
H. AXMANN.
DEVICE FOR REGULATING GAS AND AIR MIXTURES IN BUNSEN BURNERS.
No. 582,573. Patented May 11, 1897.
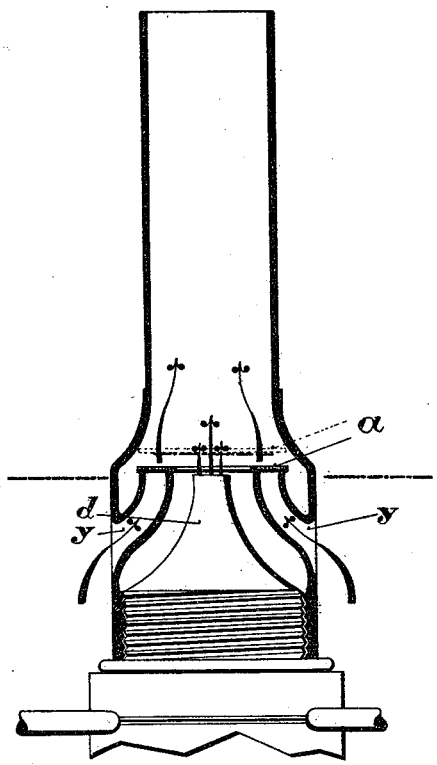
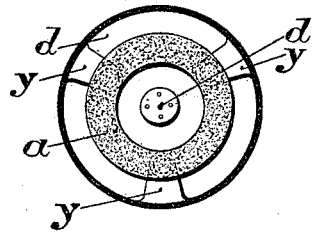
Witnesses
Inventor.
Hans Axmann.
By James L. Norris.
Atty.

UNITED STATES PATENT OFFICE.

HANS AXMANN, OF ERFURT, GERMANY.

DEVICE FOR REGULATING GAS AND AIR MIXTURES IN BUNSEN BURNERS.

SPECIFICATION forming part of Letters Patent No. 582,573, dated May 11, 1897.

Application filed July 7, 1896. Serial No. 598,353. (No model.)

*To all whom it may concern:*

Be it known that I, HANS AXMANN, doctor of medicine, a subject of the King of Prussia, German Emperor, residing at Erfurt, in the Kingdom of Prussia and German Empire, have invented new and useful Improvements in Devices for Regulating the Gas and Air Mixtures in Bunsen Burners for Incandescent Lamps, of which the following is a specification.

In the combustion of gas and air mixtures in Bunsen burners it is advantageous to obtain the gas and air of the mixture always in regular proportions, even when the gas is turned down low, with the object of producing an intimate mixing together of the gas and air.

The regulators hitherto known for gas and air mixtures are complicated and only partially attain their object, whether arrangements are employed in which the air-inlet apertures are mechanically adjusted to correspond with the gas-inlet or otherwise.

My invention is illustrated in the annexed drawings, in which—

Figure 1 represents a gas and air regulator in the form of a notched disk. Fig. 2 is a vertical section of a portion of a gas and air mixing tube, showing the operation of the regulator placed inside of said tube. Fig. 3 shows one way of applying the regulator to a Bunsen gas-burner. Fig. 4 represents an incandescent gas-lamp with the regulator arranged at the top of the gas and air mixing tube. Fig. 5 shows an elevation and a plan of a modified form of regulator. Fig. 6 shows the modified form of regulator and its guide-frame applied to an incandescent gas-lamp. Fig. 7 is a plan of the regulator guide-frame. Figs. 8 to 12 represent other modifications in the form and arrangement of the gas and air regulator, as hereinafter set forth.

In the regulating device of this invention a light disk $a$, Figs. 1 and 2, is interposed in and raised by the gas and air current, and is of such a weight that when the gas-cock is almost closed it will lie upon a seating $b$ in the mixing-tube. The disk or plate $a$ is provided with two or more notches $a'$ of such a size that when the disk $a$ lies on the seating $b$ a certain quantity of gas can still pass thereby. The disk $a$ at a part $a^2$ opposite the notches $a'$ is so weighted, either by increasing its cross-section at that part or by other means, that it opens in the manner of a flap-valve, Fig. 2, a stop $c$ serving to limit its upward movement. The disk $a$, in consequence of the inflowing gas and air mixture and in proportion to the velocity of this current, is more or less opened. In the open position it operates to produce an intimate mixing of the gas and air in the same way as the fixed obstructions arranged in different ways in the usual mixing-tubes accomplish this object. The important feature, however, in this invention, as will be seen, is that the disk $a$ exactly regulates the proportions of the mixture of gas and air even when the gas-supply is very low.

Figs. 3 and 4 show the application of the device to an incandescent burner. The disk $a$ is arranged above the gas-jet $d$, being located either at the top of the air-tube $e$, Fig. 4, or on the ring $f$, Fig. 3.

When the regulating device according to my invention is applied to Auer von Welsbach burners, it is practicable, as I have found by experiments, to turn down the burner so low that the flame no longer suffices to make the mantle glow, while at the same time no noise occurs, as is the case with the burners hitherto employed when in such a position. This regulation of proportions in the gas and air mixture admitted to the burner results from the fact that the volume of air in the mixing-tube is substantially stationary at normal atmospheric pressure, but will be increased by suction or injection when the gas-pressure is raised sufficiently to lift the regulator-disk.

The practicability of turning down the incandescent light as low as required, which may be done by means of this invention, opens up a wide field for the use of these burners in theaters, concert-rooms, operating-rooms, and the like, as when the gas-cock is turned on again the whole of the incandescent lights burn in the normal way.

Further experiments have shown me that the notches $a'$, Fig. 1, are not necessary when the disk is located so that it does not closely rest upon the ring $f$, Fig. 3, but allows a small quantity of air continuously to pass thereby. In this case also it is not necessary for the disk to work like a flap-valve, but rather that it should move vertically up and down. Such an arrangement of the disk is shown in Fig. 5 in cross-section and plan. Fig. 6 shows the manner of its application.

The disk $a$ is carried in a frame $h$, having a guide-stud $i$, on which the disk is placed loose, the stud being fixed in the arms $k$ and held up so as to present no obstacle to the passage of the gas and air. Fig. 7 is a top view of the disk-frame.

The disk, such as shown in Figs. 5 and 6, may also be formed into a cone $a^2$, as shown in Fig. 8, or into a half-sphere $a^3$, as shown in Fig. 9; also, instead of a half-sphere a solid or hollow sphere $a'$ may be employed, as shown in Fig. 10, in which case a guide-stud is not required. If desired, the half-sphere and sphere may also be provided with through apertures $a'$, or notches may be made in their seatings; also, instead of the disk a ring $a$, Figs. 11 and 12, may be employed as a regulating device, said ring lying over the air-inlet orifices $y$, which are separated from the gas-nozzle $d$. The gas streaming out of the nozzle $d$ causes such a suction that the annular regulator $a$ is lifted by the air rushing in in proportion to the gas-pressure.

In the methods described for carrying out the invention the form of the regulating-organ, whether disk, cone, sphere, or ring, and the material of which it is made are determined by the pressure of gas or air or gas and air which obtains in the particular case.

Having fully described my invention, what I claim, and desire to secure by Letters Patent, is—

The combination with an incandescent gas-lamp and Bunsen burner, of a vertically-vibratory gas and air mixing regulator adapted and arranged to automatically control the admission of air to the gas and air mixing tube according to the volume or velocity of the gas-supply, substantially as described.

In testimony whereof I have hereunto set my hand in presence of two subscribing witnesses.

HANS AXMANN.

Witnesses:
MARTHA FRENZEL,
FRITZ SCHNELL.